United States Patent [19]
Fath et al.

[11] Patent Number: 5,128,160
[45] Date of Patent: Jul. 7, 1992

[54] METHOD FOR THE PRESERVATION OF FRESH VEGETABLES

[75] Inventors: Daniel Fath; Pierre Soudain, both of Paris, France

[73] Assignee: l'Air Liquide, Societe Anonyme pour l'Etude et l'Exploitation des Procedes Georges Claude, Paris, France

[21] Appl. No.: 552,652

[22] Filed: Jul. 16, 1990

[30] Foreign Application Priority Data

Oct. 5, 1989 [FR] France .................... 89 13015

[51] Int. Cl.⁵ .............. A23B 7/152; B63B 31/00
[52] U.S. Cl. .................... 426/316; 426/319; 426/419
[58] Field of Search .............. 426/316, 319, 419, 418

[56] References Cited

U.S. PATENT DOCUMENTS

| | | | |
|---|---|---|---|
| 3,335,014 | 8/1967 | Balestra | 426/316 |
| 3,365,307 | 1/1968 | Dixon | 426/419 |
| 3,511,671 | 5/1970 | Miles | 426/319 |
| 5,071,667 | 12/1991 | Grüne et al. | 426/316 |

FOREIGN PATENT DOCUMENTS

| | | | |
|---|---|---|---|
| 1582927 | 10/1969 | France | 426/316 |
| 7309463 | 1/1974 | Netherlands | 426/316 |

OTHER PUBLICATIONS

Controlled and Modified atmosphere packaging, Fran Labell, Food Processing, Jan. 1985, pp. 152-154.

*Primary Examiner*—Donald E. Czaja
*Assistant Examiner*—J. Aberle
*Attorney, Agent, or Firm*—Browdy & Neimark

[57] ABSTRACT

Fresh fruit and vegetables are preserved under refrigerated temperatures generally between 0° C. and 20° C. by placing the fruits and vegetables in a gaseous atmosphere initially containing an effective amount of nitrogen monoxide or argon in the range of 10-100%, with optionally up to 50% oxygen, any remainder being composed of an inert gas. The fruits and vegetables may be maintained continuously in such atmosphere or in stages interspersed by placing the vegetable products in a different atmosphere.

16 Claims, 1 Drawing Sheet

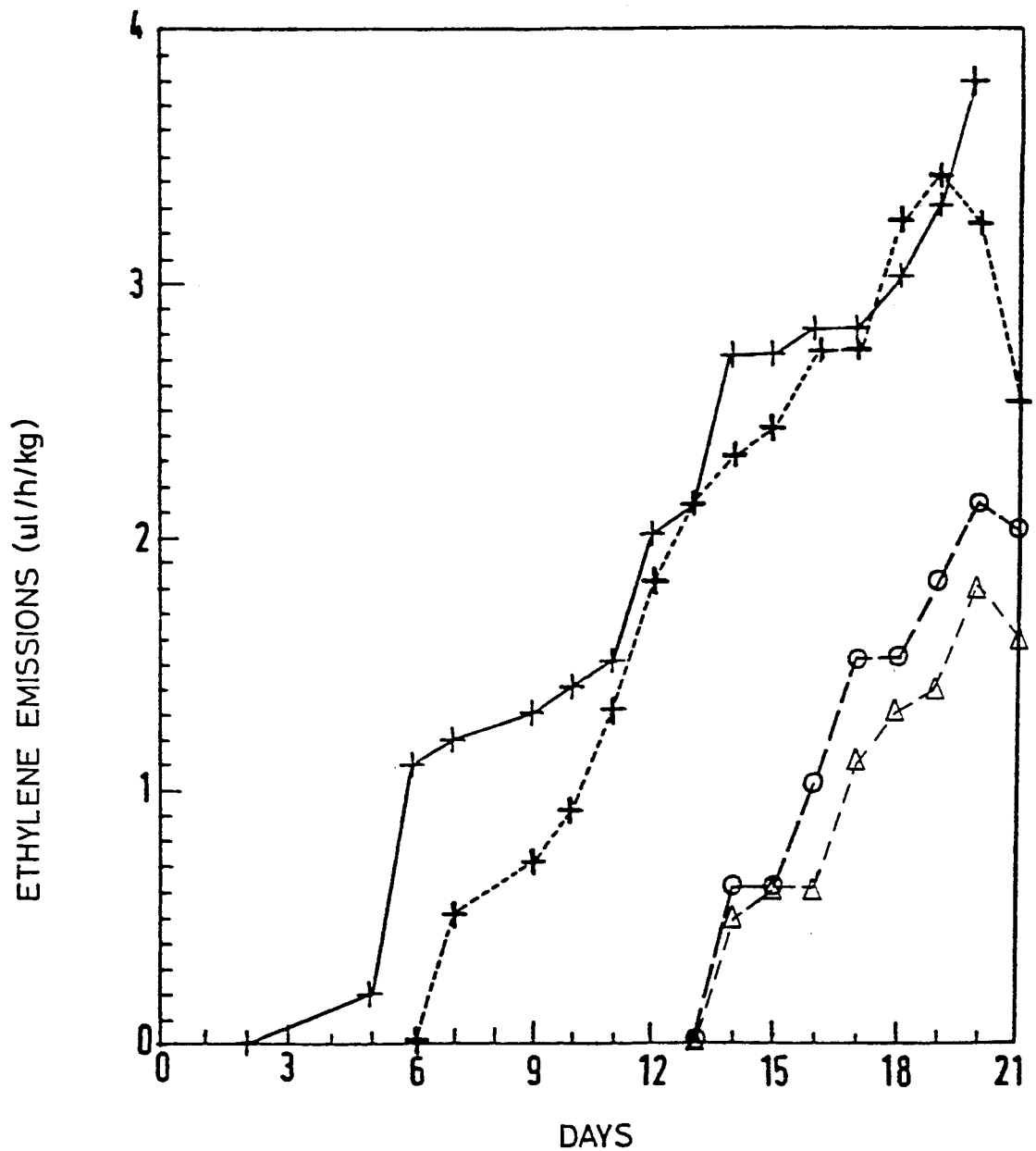

METHOD FOR THE PRESERVATION OF FRESH VEGETABLES

FIELD OF INVENTION

The present invention pertains to preservation treatment processes for fresh edible plant products, more specifically fruits and vegetables, in a gaseous treatment atmosphere. "Fresh plant products" are defined as edible food products of vegetable origin that are freshly-picked and untreated, with the exception of cleaning operations, and, if applicable, simple separation into pieces.

BACKGROUND OF INVENTION

Gaseous treatments, generally combined with cooling, applied to different fruit and vegetable species to optimize their survival after picking, are now highly diversified and, as a rule, use nitrogen, carbon dioxide, oxygen, carbon monoxide or sulfur dioxide. It has also been proposed to use mixtures of nitrogen monoxide and oxygen in the processing of meat and milk derived food products.

The preservation of fresh edible plant products presents specific problems due especially to their respiration, natural ethylene emission and propensity to be attacked by numerous fungal strains. Moreover, especially for fruits, the preservation of the organoleptic qualities and outside appearance are very important parameters for consumers.

SUMMARY OF INVENTION

An object of this invention is to provide new processes for treating fresh edible plant products in a gaseous atmosphere, said processes being inexpensive, easy to implement and allowing the organoleptic qualities, texture and appearance of said products to be well preserved and for a longer period of time.

According to one characteristic of the invention, the preservation treatment process comprises an initial stage wherein the vegetable products to be preserved are placed at a refrigerated temperature, i.e. generally between 0° C. and 20° C., under a pressure of 0.5 to $3 \times 10^5$ Pa in a gaseous atmosphere initially containing 10 to 100% nitrogen monoxide or argon, or a mixture of the two, between 0 and 50% oxygen, with any remainder being composed of an inert gas, for more than one hour.

According to another aspect of the invention, the process comprises an initial stage wherein the products are placed at a refrigerated temperature under a pressure between 0.5 and $3 \times 10^5$ Pa in a gaseous atmosphere containing a concentration of 10 to 100% nitrogen monoxide or argon, or a mixture of the two, and substantially free of oxygen, for a period of one hour to seven days, followed by a second stage wherein the products are kept substantially at the same temperature in an atmosphere containing 2 to 20% oxygen for at least twelve (12) hours.

BRIEF DESCRIPTION OF DRAWING

The sole figure is a graph showing advantages of of the present invention.

DETAILED DESCRIPTION OF EMBODIMENTS

It has now been found that nitrogen monoxide and argon have remarkable intrinsic properties on the preservation of fresh plants, effectively complementing a temporary anoxia, slowing down the ripening process, and this is reflected spectacularly by the slowing of ethylene synthesis, by the preservation of the texture of the products, and by a very pronounced fungistatic action.

Depending on the product under consideration and the expected length of the preservation period, the diversity and complementarity of these various effects make it possible either to use (1) continuous treatments, wherein the initial treatment atmosphere is kept identical in a controlled manner or progressively modified in an evolutive manner for the entire preservation period, or (2) discontinuous treatments taking advantage of the surprising remanence effect of the first stage treatment, subsequently placing the products pretreated by the first stage treatment in a different atmosphere that contains oxygen and that can simply be ambient air, it being possible to reactivate the remanence effect by subsequently reapplying at least one additional first-stage treatment to the products.

In the first approach (continuous treatment), one can thus implement a process for controlling the treatment atmosphere during the entire treatment operation, in which said atmosphere at least initially contains from 10 to 100%, typically at the industrial level from 50 to 80% nitrogen monoxide or argon, or a mixture of the two, from 2 to 20% and typically from 15 to 20% oxygen and the remainder if any being composed of an inert gas in the sense of this invention, i.e. nitrogen, carbon dioxide or another rare gas or mixtures thereof. The pressure of the gaseous treatment atmosphere is between 0.5 and $3 \times 10^5$ Pa, typically at the industrial level $1 \times 10^5$ Pa, with the temperature being held at the minimum allowable value for the plant product under consideration, i.e. generally between 1° C. and 17° C. Also, depending on the type of plant product under consideration, the length of treatment is between approximately two days for very fragile species such as raspberries and can last for more than one month for less fragile species such as tomatoes.

Thus, as an example, the optimal preservation of tomatoes in a precocious state of ripeness can be maintained for more than five weeks at the temperature of 12° C. under an atmosphere composed of approximately 80% nitrogen monoxide and 20% oxygen at atmospheric pressure.

The continuous process can also be used with a pre-established evolution of the gaseous atmosphere in a second phase, in gas-impermeable packages or containers, or, on the contrary, in a container comprising a wall that is semi-permeable to gas. In the first case (sealed package) wherein the respiration of the plant products is used to consume part of the oxygen in the initial atmosphere and correlatively to produce carbon dioxide, the composition of the initial gaseous mixture is desirably as follows: 20 to 90%, typically at the industrial level 70 to 80%, nitrogen monoxide or argon or a mixture of the two; 10 to 50%, typically 20 to 30%, oxygen; and any remainder being composed of an inert gas as defined above.

As examples of this technique that can be implemented in industrial containers or in individual impermeable film packages, there can be cited the preservation of melon slices for at least 18 days at 4° C. in a gaseous atmosphere at atmospheric pressure, initially composed of 80% nitrogen monoxide and 20% oxygen, or the preservation of cherries (Burlat or Starkins) for at least 15 days at 4° C. in a gaseous atmosphere at atmospheric pressure initially composed of 70% nitrogen monoxide and 30% oxygen.

In the second case, wherein the semi-permeable wall allows the progressive penetration of oxygen and, at the same time, the extraction of the carbon dioxide produced, we use a gaseous treatment atmosphere composed initially of 10 to 100%, preferably 50 to 100% and industrially 95 to 100% nitrogen monoxide or argon or a mixture of the two; 0 to 20%, typically 0 to 5%, oxygen; and the remainder, if any, being composed of an inert gas.

As examples of this technique, there can be cited the preservation of melons in an individual package with a semi-permeable oriented polypropylene film such as the one marketed under the name "MG 35" by Société ICI for over twelve days, at the temperature of 6° C. and at atmospheric pressure with an initial gaseous atmosphere composed of 100% nitrogen monoxide, and the preservation of raspberries in baskets placed on a pallet enclosed in a low-density polyethylene film bag for at least 10 days at a temperature of 2° C. and at atmospheric pressure with an initial gaseous atmosphere composed of 100% nitrogen monoxide.

An additional advantage of keeping plants in an atmosphere containing argon and/or more particularly nitrogen monoxide during the preservation period has been found, i.e. a surprising property of these gases in accelerating the cicatrization of the plant parts, especially climacteric fruits, thus contributing greatly to the decrease, even the elimination, of fungal attacks.

The discontinuous process according to the second approach, taking advantage of the aforementioned remanence effect, consists of placing the products for a limited period of time in a substantially oxygen-free atmosphere containing from 10 to 100%, typically 50 to 100% and preferably 95 to 100% nitrogen monoxide or argon, or a mixture of the two, with the remainder if any being composed of an inert gas. The length of pretreatment at the same refrigerated temperature as above and at a pressure of between 5 and $3 \times 10^5$ Pa, depending on the concentration of the treatment gas and pressure thereof, is between one hour for high-respiration fruits such as bananas, and approximately seven days for low-respiration fruits such as strawberries, the length of said first phase typically being between twelve (12) hours and forty-eight (48) hours. At the end of said first phase, the products are placed in a given gaseous atmosphere, this time containing between 2 and 20%, typically between 10 and 20% oxygen, introduced into the pre-existing atmosphere for example using a semi-permeable membrane, or more simply by placement in the open air.

As an example of the remarkable effects of the present technique, the sole figure shows the ethylene emissions of tomatoes having undergone pretreatment for forty-eight (48) hours in an atmosphere composed initially of 100% argon or nitrogen monoxide, then returned to the open air, in comparison with a similar pretreatment with nitrogen and a control sample with no pretreatment. It should be noted that in comparison with a simple delay of about three days in ethylene emission which occurs upon treatment with nitrogen, the pretreatment according to the invention not only generates an 11-day delay in the beginning of ethylene synthesis, but considerably limits the latter in the subsequent days.

In Kiwi fruit, ethylene emission is similarly blocked for fifteen days by an identical pretreatment with nitrogen monoxide or argon. It must be noted here that ethylene emission is a significant parameter in the evolution of ripening processes in general, which thus demonstrates the effectiveness of the process for preserving fruits and vegetables according to the invention.

As another example, there can also be cited the pretreatment of cherries at 4° C. for 12 hours at atmospheric pressure, under an atmosphere composed initially of 100% nitrogen monoxide or argon, subsequently allowing preservation for at least sixteen (16) days in open air, still at 4° C. and afterwards making it possible to keep the cherries in perfect condition for four days, this time at ambient temperature, for example, in a stall.

Depending on the desired length of preservation and the type of product considered, according to one aspect of the invention the first stage of pretreatment can be repeated substantially identically at least once after the pretreated products are placed temporarily in the open air, for example after 12 days for tomatoes, which accordingly delays the undesired ripening process of the products.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. Preservation treatment process for fresh edible plant products, comprising placing said products in a gas tight chamber at a refrigerated temperature under a pressure of between 0.5 and $3 \times 10^5$ Pa in a gaseous atmosphere of initially at least 10% but less than 70% nitrogen monoxide, argon or a mixture thereof, about 30% oxygen, any remainder being an inert gas, for a duration of more than one hour, and maintaining the products in the chamber substantially at the same temperature and at ambient pressure.

2. Preservation treatment process for edible fresh plant products comprising in an initial stage placing the products in a treatment chamber at a refrigerated temperature under a pressure of between 0.5 and $3 \times 10^5$ Pa in a first atmosphere initially of 10 to 100% nitrogen monoxide, argon or a mixture thereof, free of oxygen, for a period of one hour to seven days; and then in a second stage keeping the products for at least twelve hours at substantially the same temperature in a second atmosphere, different from said first atmosphere, containing 2 to 20% oxygen, and after the second stage the products are packed and shipped.

3. Process according to claim 2, wherein the first atmosphere comprises 50 to 100% nitrogen monoxide, argon or a mixture thereof.

4. Process according to claim 3, wherein the first atmosphere comprises more than 95% nitrogen monoxide, argon or a mixture thereof.

5. Process according to claim 4, wherein the second atmosphere comprises between 10 and 20% oxygen.

6. Process according to claim 5, wherein the second atmosphere of the second stage is ambient air.

7. Process according to claim 4, wherein the length of the initial stage is between 12 hours and 48 hours.

8. Process according to claim 7, wherein, at the end of the second stage, the first stage is repeated and followed by another second stage.

9. The process of claim 1, wherein the chamber is a substantially gas-impermeable individual package.

10. A preservation treatment process for fresh vegetable products comprising placing temporarily the products in a treatment chamber at a refrigerated temperature in a first atmosphere consisting of argon at a pressure between 0.5 and $3 \times 10^5$ Pa, substituting the first atmosphere with a second atmosphere containing more than 5% oxygen for a period of at least 12 hours, and afterwards packing and shipping the products.

11. A preservation treatment process for fresh edible vegetable products comprising a first step of placing the products in a gas-tight chamber at a positive temperature under 20° C. under a first atmosphere initially of 50 to 100% nitrogen monoxide free of oxygen, any remainder being an inert gas, for a period of 2 hours to 48 hours, a second step of maintaining the products substantially at the same temperature under a second atmosphere containing more than 5% of oxygen for a period of at least 12 hours, and at least one third step comprising either packing and shipping the products or repeating a cycle of said first and second steps.

12. The process of claim 11, wherein said third step comprises packing and shipping the products.

13. The process of claim 11, wherein said third step comprises at least a second cycle of said first and second steps repeated after said second step.

14. The process of claim 12, wherein at least a second cycle of said first and second steps is repeated after said second step and before said third step.

15. The process of claim 11, wherein the products are tomatoes.

16. The process of claim 11, wherein the products are fruits.

* * * * *